United States Patent [19]

Demonty

[11] 4,338,039
[45] Jul. 6, 1982

[54] TOENAIL

[76] Inventor: Guillermo A. Demonty, 119 Nova Albion Way, San Rafael, Calif. 94903

[21] Appl. No.: 126,500

[22] Filed: Mar. 3, 1980

[51] Int. Cl.³ .............................................. F16B 1/00
[52] U.S. Cl. ................................ 403/230; 403/186; 403/403; 411/461; 411/457
[58] Field of Search ...................... 411/461, 473, 457; 403/230, 283, 280, 232.1, 403, 231, 186

[56] References Cited

U.S. PATENT DOCUMENTS 2,398,603  4/1946  Soderberg ........................... 411/457
2,596,181  5/1952  Soderberg et al. ................. 411/461

FOREIGN PATENT DOCUMENTS 464619   1/1914   France ................................ 411/461
47-42431 of 1972  Japan ................................. 411/461
76321   12/1917   Switzerland ....................... 411/461

Primary Examiner—Andrew V. Kundrat
Attorney, Agent, or Firm—Phillips, Moore, Lempio & Majestic

[57] ABSTRACT

Disclosed is a toenail having a generally triangular shaped head and one or more shanks. The head has two wood bearing surfaces which are typically formed at right angles to each other and a third head surface adapted to be driven, typically by a hammer. The shanks extend from the wood bearing surfaces preferably in a direction perpendicular to and away from the head surface. The shanks are preferably formed as an integral extension of the head thus providing a very rigid fastener for joining the intersecting faces of two boards such as a vertical stud and a horizontal plate. The shanks are positioned and sized so that when the tips of the shanks are registered to the intersecting faces of the intersecting boards, the wood bearing surfaces are parallel to their opposed intersecting board surfaces. Thus, when the shanks of the toenail are driven into the intersecting boards, the bearing surfaces driven into flush engagement with the surfaces of the intersecting boards, thereby providing a superior, very rigid attachment between said boards.

33 Claims, 4 Drawing Figures

TOENAIL

This invention is related to nails, particularly the type for joining intersecting boards along their intersecting surfaces.

BACKGROUND OF THE INVENTION

Nails are widely used to join two pieces of material and are available in various forms. Nails essentially comprise two portions, a head and a shank. Heretofore the head of a nail, as well as the head portion of similar fasteners such as staples, has been intended merely to provide a surface by which the shank is driven into the typically wooden surface.

One fastening task which has been particularly vexatious is the nailing of a vertical stud to a horizontal plate, called toenailing. In the usual manner the carpenter drives a standard nail into the face of the stud at an angle so that it passes through a portion of the stud and into the plate. This has several drawbacks, including a tendency of the stud to kick out at its plate abutting end. This occurs because the entire driving force is against the stud until the nail has passed through the stud and has begun entering the plate. To counteract the tendency to kick out, the carpenter often must brace the other side of the stud with his foot. Such a procedure is quite cumbersome. Further, especially among the less adept, toenailing in the usual fashion often causes the stud to split, thus drastically reducing the strength of the joint. The common toenailed joint, even if properly done, is quite weak especially with regard to bending stresses.

The prior art discloses several multi-shanked fasteners. The fastener shown in U.S. Pat No. 1,774,867, has a plurality of shanks extending from a common head. Another fastening device shown in U.S. Pat No. 3,011,226, has a plurality of upwardly extending shanks for securing the coplanar sides of intersecting boards. However, neither of the above two patents disclose a device which is at all suitable for toenailing intersecting boards. The first mentioned patent discloses a wallboard tack or staple, the head of which lacks the strength or rigidity for toenailing a stud to a plate. The second mentioned patent discloses a gusset plate and therefore is suitable only for joining coplanar surfaces of two intersecting members, not intersecting boards along their intersecting surfaces.

Other U.S. Patents which may be of interest are U.S. Pat. Nos. 2,520,231 and 2,569,532.

Although problems resulting from toenailing boards using standard nails have been well recognized, a superior means for toenailing intersecting boards has not heretofore been available.

SUMMARY OF THE INVENTION

The present invention solves the problems of the prior art by providing a toenail which is easy to use, cheap to produce, and provides an extraordinarily rigid joint.

The toenail of the invention has a generally triangularly shaped head and preferably two or more shanks. The head has two wood bearing surfaces which are typically formed at right angles to each other and a third head surface adapted to be driven, typically by a hammer. The shanks extend from the wood bearing surfaces preferably in a direction perpendicular to and away from the head surface. The shanks are typically formed as integral extensions of the head thus providing a very rigid fastener for joining the intersecting faces of two boards, such as a vertical stud and a horizontal plate. The shanks are positioned and sized so that when the tips of the shanks are registered to the intersecting faces of the intersecting boards, the wood bearing surfaces are parallel to their opposed intersecting board surfaces. Therefore, when the shanks of the toenail are driven into the intersecting boards, the bearing surfaces are driven into flush, abutting engagement with the surfaces of the intersecting boards, thereby providing a very rigid attachment between said boards.

A primary object of the present invention is to provide a toenail having a triangularly shaped head, the head having two wood bearing surfaces for engaging the intersecting surfaces of intersecting boards. This aspect of the invention provides a toenail which is extremely stiff thus producing a superior, very rigid toenailed joint.

Another object of the invention is the provision of one or more shanks, preferably two or more, extending from the wood bearing surfaces of the toenail at an angle which is normal to the head surface. Therefore, when the toenail is driven by a hammer striking the head surface, the shanks are driven into the wood by forces parallel to their central axes. Further, in the preferred embodiment the toenail is provided with a shank extending from each woodbearing surfaces so that tendency for the stud to kick out is greatly reduced because the driving force is directed into both the stud and the plate and the tips of the shanks enter both boards at approximately the same time.

A further object of the invention is to provide a toenail which is self-aligning in use. This object is accomplished preferably by providing three shanks, one shank extending from each wood bearing surface and a third shank extending from the intersection of the two wood bearing surfaces. The length of the shanks are then chosen so that when the toenail is registered to the intersecting surfaces with the center shank at or close to the intersecting surfaces, the wood bearing surfaces are parallel to their respective board surface. This self-aligning aspect makes the toenail easier to use, allows truer alignment of the toenail and also reduces the tendency of the stud to kick out since typically two or three shanks engage the plate.

Other objects, features and advantages of the present invention will appear from the following description in which the preferred embodiment has been set forth in detail in conjunction with the accompanying drawings.

DETAILED DESCRIPTION OF THE PREFERRED EMBODIMENT

Turning now to the figures, generally toenail 2 has a triangularly shaped head 4 and shanks 6, 8 and 10.

The head and shanks are typically formed from a single sheet of material, such as by punching from sheet metal stock and thus can be manufactured cheaply.

Figure 1:
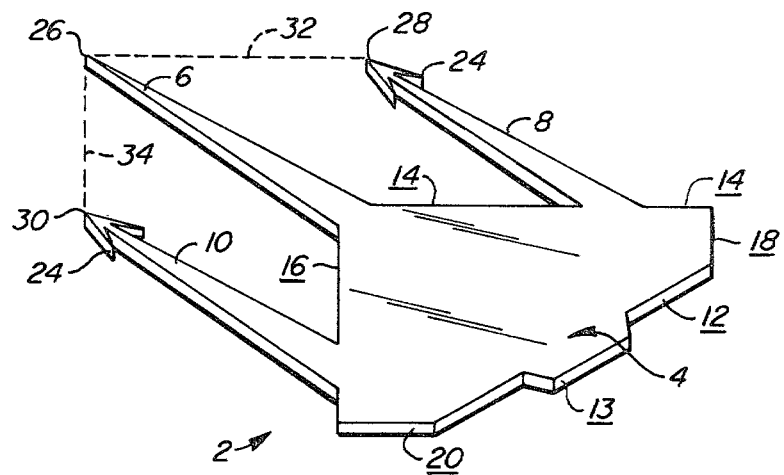
FIG. 1 is a perspective view of the toenail of the present invention.
Figure 2A:
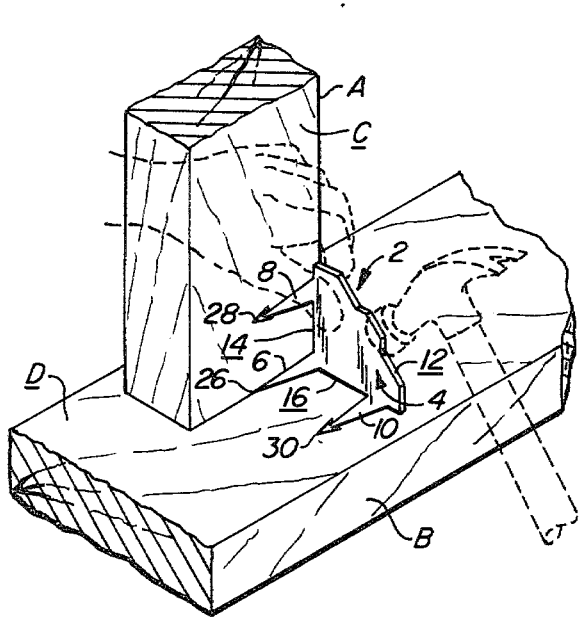
FIG. 2a shows a toenail of the preferred embodiment registered to the intersecting faces of the intersecting boards.
Figure 2B:
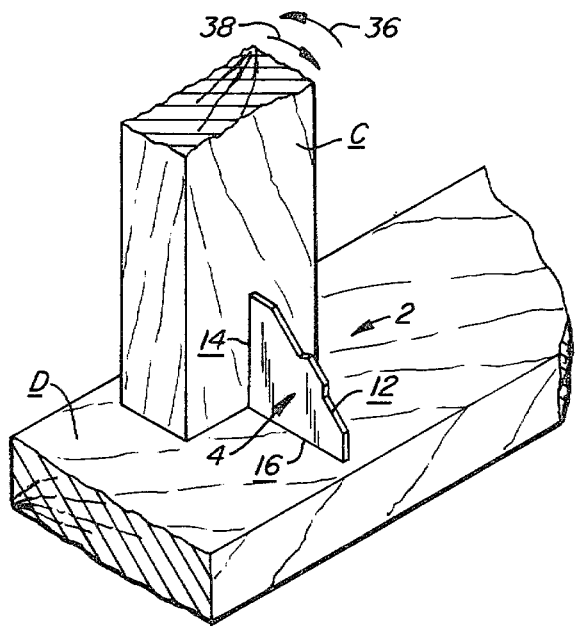
FIG. 2b shows the toenail of FIG. 2a driven into full engagement with the two boards.
Figure 3:
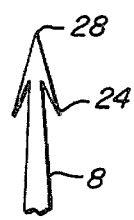
FIG. 3 is an enlarged view of the tip of a shank.

Head 4 is a generally triangularly shaped member having a head surface 12 and wood engaging surfaces 14, 16. Head surface 12 may be flat or it may have some other configuration. In the preferred embodiment surface 12 has a raised hammer engaging portion 13 disposed centrally along surface 12. For the purposes of this application, the toenail will be described with reference to a generally vertical stud A abutting a generally horizontal plate B as shown in FIGS. 2A and 2B. However, the invention is suitable for use in other situations where two intersecting boards are to be joined. Surfaces 14, 16 are generally perpendicular for abutting engagement with the perpendicular intersecting faces C and D of stud A and plate B respectively. Flats 18, 20 join surfaces 12 and 14 and surfaces 12 and 16, respectively. The thickness of head 4, and therefore the width of surfaces 12-20, is sufficient to ensure that the head is stiff enough to resist bending moments imparted to the head through the shanks by the stud and the plate. For example, a toenail of the invention made from 1/16 inch thick cold rolled steel with wood bearing surfaces 4 and 16 approximately one inch long has proven satisfactory.

Shank 6 extends from point 22 generally where the bearing surfaces would intersect. Shanks 8 and 10 extend from bearing surfaces 14 and 16 near flats 18 and 20, respectively. Shanks 8 and 10 preferably have barbs 24 formed at their distal end. The barbs help to ensure the secure anchoring of the shanks within the stud and the plate. Tips 26, 28 and 30 of shanks 6, 8 and 10 respectively are aligned so that the line of intersection 32 of tips 26 and 28 is parallel to bearing surface 14 and line of intersection 34 is parallel to bearing surface 16. This facilitates proper alignment of the toenail prior to being driven into the stud and the plate as discussed below.

Although the use of the disclosed toenail should now be apparent, it will be briefly described with particular reference to FIGS. 2A and 2B. FIG. 2A shows the tips and the shanks of the toenail registered to surfaces of the stud and plate. It should be noted that bearing surfaces 14 and 16 are parallel to intersecting stud face C and plate face D, respectively. The shanks of the toenail are then driven into the stud and plate typically by a hammer, until the bearing surfaces abut the surfaces of the stud and plate as shown in FIG. 2B. It should be apparent that forces on the stud in direction of arrow 36 are effectively resisted by the shanks imbedded within the wood with head 4 acting as a tensive element. Forces in the direction of arrow 38 are effectively resisted by the wood bearing surfaces producing compressive stresses on head 4. Since the head is relatively thick, it can resist buckling and this provides substantial resistance to the applied compressive forces. If desired additional toenails may be used to more even securely anchor the stud. They may be used on the same side, or on adjacent or opposite sides or a combination thereof.

Although in the disclosed preferred embodiment three shanks are included in the toenail, more or fewer shanks may be employed. If only shanks 8 and 10 are used, the toenail will lose the self-aligning aspect provided by shank 6. Regardless of the number of shanks employed, it is still desired that when the toenail is registered at the joint with surfaces 14 and 16 parallel to the board surfaces, that the tips of the shanks be touching the board surfaces. This touching of the tips to the board surfaces insures that when the toenail is driven into the boards, both shanks simultaneously enter the respective board. Any tendency for the toenail to cock and be driven in skewed is thereby reduced. In certain situations it may be desired that a single shank be used. Although much of the tensive holding ability, discussed above as the toenail's resistance to forces in the direction of arrow 36, is lost, the compressive strength will remain.

The best mode contemplated for carrying out the present invention has been herein shown and described, however, it will be apparent that modification and variation may be made without departing from what is regarded to be the subject of the invention.

What is claimed is:

1. A flat nail finding particular utility for toenailing two intersecting boards comprising:
    a head;
    a first side of said head having first and second converging bearing surfaces for abutting intersecting faces of said boards, and a second opposite side of said head having a head surface disposed transversely relative to said bearing surfaces and adapted for being driven; and
    at least one shank disposed in the same flat plane as said head and extending from at least one of said first and second bearing surfaces so that when said head surface is driven, said shank is driven into at least one said board until said first and second surfaces abut respective intersecting faces of said intersecting boards.

2. The nail of claim 1 wherein said head is generally triangular and said shank extends outwardly at least approximately from the terminations of said first and second bearing surfaces.

3. The nail of claim 2 wherein said first and second bearing surfaces are at least approximately perpendicular relative to each other.

4. The nail of claim 2 wherein said first and second surfaces are of generally equal length.

5. The nail of claim 2 wherein said first and second bearing surfaces are at least approximately perpendicular relative to each other and are of generally equal length.

6. The nail of claim 1 wherein said head surface is generally flat and said nail is a single, unitary piece.

7. The nail of claim 1 wherein there is one said shank.

8. The nail of claim 1 wherein a first shank extends from said first surface and a second shank extends from said second surface.

9. The nail of claim 8 wherein a third shank extends from the intersection of said first and second surfaces.

10. The nail of claim 1 wherein first and second shanks extend from said first surface.

11. The nail of claim 1 wherein said shank extends in a direction normal to said head surface.

12. The nail of claim 11 wherein a first shank extends from said first surface and a second shank extends from said second surface.

13. The nail of claim 8 or 12 further comprising means for aligning said first and second surfaces with the respective intersecting board surfaces prior to driving said nail.

14. The nail of claim 1 wherein said shank includes barb means for insuring said protruding means remain engaged within said wood.

15. A board joint comprising:
    first and second intersecting boards, said boards having adjacent and perpendicularly disposed first and second intersecting board faces respectively;
    flat nail means for joining said intersecting boards comprising:

a generally triangular head including first and second converging bearing surfaces for abutting said first and second board faces, and a head surface adapted for being driven; and at least one shank extending from at least one of said first and second bearing surfaces in a direction generally perpendicular to said head surface, said at least one shank of said nail being driven into at least one of said boards so that said first and second bearing surfaces abut said first and second board faces respectively to produce a rigid board joint.

16. The board joint of claim 15 wherein said boards intersect at a right angle.

17. The board joint of claim 16 wherein said first and second bearing surfaces are perpendicular.

18. The board joint of claim 15 wherein said first board is a stud and said second board is a plate.

19. The board joint of claim 15 wherein a first shank extends from said first bearing surface and engages said first board and a second shank extends from said second bearing surface and engages said second board.

20. The board joint of claim 19 wherein a third shank extends from said head at the intersection of said bearing surfaces, the tips of said first and third shanks and of said second and third shanks lying generally parallel to their respective abutting surfaces thereby facilitating the proper alignment of said nail prior to being driven into engagement with said abutting boards.

21. The board of claim 15 wherein said generally triangular head is a generally isosceles triangular head wherein said head surface is the base.

22. The board of claim 21 wherein said first and second surfaces intersect at a right angle and said head surface is the hypotenuse.

23. A method for securing first and second intersecting boards along their intersecting faces comprising the following steps:
registering said first and second boards so that a face of said first board is disposed in perpendicular relationship relative to a face of said second board;
providing a flat nail having a generally triangularly shaped head, said head having first and second bearing surfaces configured to abut the intersecting faces of the boards and a head surface by which said nail is driven and having first and second shanks extending from said first and second bearing surfaces generally normal to said head surface;
positioning said nail adjacent to the juncture of said intersecting faces of said boards so that said bearing surfaces are generally parallel to said faces; and
driving said head toward the junction of said intersecting surfaces thereby forcing said shanks into said boards to secure said intersecting boards.

24. The method according to claim 23 further comprising the step of seating said first and second bearing surfaces against said respective board faces thereby insuring that said intersecting boards are firmly secured.

25. The method according to claim 23 wherein the providing step includes the step of providing a nail having first, second and third shanks, said third shank extending from the intersection of said first and second bearing surfaces.

26. The method according to claim 23 wherein the step of providing includes the step of providing two said nails.

27. The method according to claim 23 wherein the step of registering further comprises the step of placing the end of a vertical stud against the horizontal surface of a plate.

28. A flat toenail used for joining a generally vertical stud and a generally horizontal plate comprising:
a generally triangular head, said head having converging first and second intersecting, generally perpendicular wood bearing surfaces for abutting the intersecting surfaces of said stud and said plate, respectively, and a head surface for being driven; and
a first shank extending from said first bearing surface, a second shank extending from said second bearing surface, said shanks directed away from and normal to said head surface so that when said head surface is driven, said shanks enter said stud and plate until said bearing surfaces abut said stud surface and said plate surface, said head and said first and second shanks being disposed in the same flat plane.

29. A toenail of claim 28 further comprising:
a third shank extending generally from the intersection of said first and second bearing surfaces generally parallel to said first and second shanks, and
means for aligning said first and second bearing surfaces with the respective intersecting stud and plate surfaces.

30. The toenail of claim 29 further comprising barb means for opposing the removal of said shanks from said stud and plate.

31. A flat one-piece nail comprising
a head defining a head surface and a pair of bearing surfaces extending away from said head surface in converging relationship relative to each other to terminate at an apex thereof, and
a plurality of laterally spaced and generally parallel shanks extending away from said bearing surfaces and said head surface.

32. The nail of claim 31 wherein each of said shanks is tapered to terminate at a point on a free end thereof and is at least generally perpendicular relative to said head surface.

33. The nail of claim 31 wherein said shanks comprise an intermediate shank extending away from the apex of said bearing surfaces and a pair of outer shanks each extending away from a respective one of said bearing surfaces.

* * * * *